(12) United States Patent
Sun et al.

(10) Patent No.: US 10,591,802 B2
(45) Date of Patent: Mar. 17, 2020

(54) ON-CHIP OPTICAL PHASED ARRAY USING A SERIAL GRATING ANTENNA DESIGN

(71) Applicant: Litexel Inc., Walnut, CA (US)

(72) Inventors: Xiaochen Sun, Chino Hills, CA (US);
Lingxuan Zhang, Walnut, CA (US);
Ningning Feng, Acadia, CA (US)

(73) Assignee: Litexel Inc., Walnut, CA (US)

( * ) Notice: Subject to any disclaimer, the term of this patent is extended or adjusted under 35 U.S.C. 154(b) by 0 days.

(21) Appl. No.: 15/874,779

(22) Filed: Jan. 18, 2018

(65) Prior Publication Data
US 2019/0219888 A1    Jul. 18, 2019

(51) Int. Cl.
*G02F 1/295* (2006.01)
*G02B 6/12* (2006.01)
*G02B 6/26* (2006.01)
*G02B 6/34* (2006.01)

(52) U.S. Cl.
CPC ...... *G02F 1/2955* (2013.01); *G02F 2201/066* (2013.01); *G02F 2201/302* (2013.01); *G02F 2203/50* (2013.01)

(58) Field of Classification Search
CPC .................................................. G02F 1/2955
USPC ............................ 385/1–4, 8, 10, 14, 27, 37
See application file for complete search history.

(56) References Cited

U.S. PATENT DOCUMENTS

| | | | |
|---|---|---|---|
| 4,764,738 A | 8/1988 | Fried | |
| 5,233,673 A | 8/1993 | Vali et al. | |
| 8,988,754 B2 | 3/2015 | Sun et al. | |
| 2016/0320475 A1* | 11/2016 | Kellar | G01S 13/42 |
| 2018/0210394 A1* | 7/2018 | Favalora | H04N 13/305 |

\* cited by examiner

*Primary Examiner* — Kaveh C Kianni
*Assistant Examiner* — Hung Q Lam
(74) *Attorney, Agent, or Firm* — Chen Yoshimura LLP

(57) ABSTRACT

An on-chip optical phased array includes an array of photonic antenna units connected in series by photonic waveguides and arranged in a two-dimensional array to produce complex still and scanning optical patterns through optical interference effect. Each antenna unit includes an output photonic antenna (e.g. grating antenna), and a waveguide phase shifter for adjusting the optical phase of the optical beam output by the antenna unit. The grating antenna and the waveguide phase shifter are formed in the same optical wave guiding layer which includes a core layer between two cladding layers. The grating antennas may be a shallow-etched structure or a deep-etched edge-modulated grating. The optical phased array, including the array of photonic antenna units and the electrodes that connect and provide electrical power to them, can be made on a single chip of silicon using complementary metal-oxide-semiconductor (CMOS) or compatible fabrication processes.

8 Claims, 7 Drawing Sheets

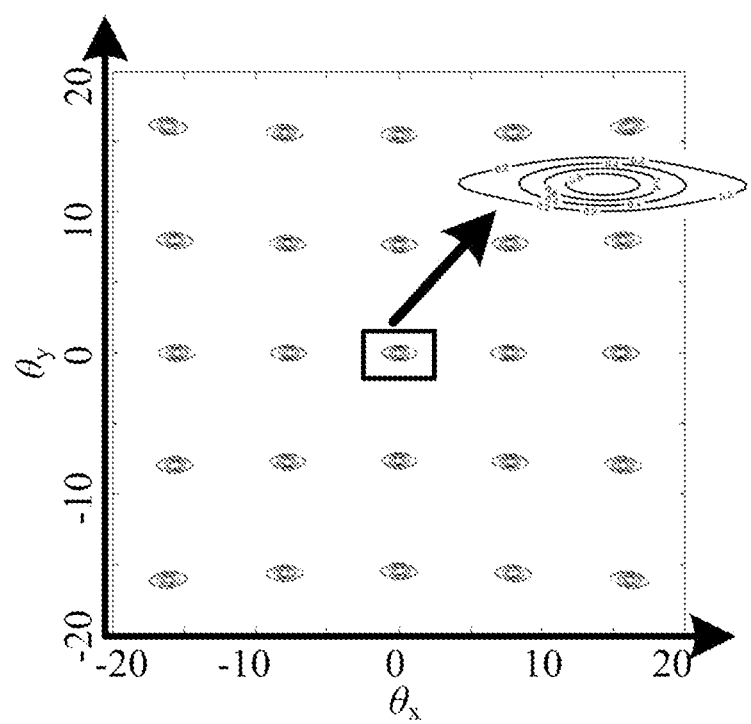
FIG. 8A
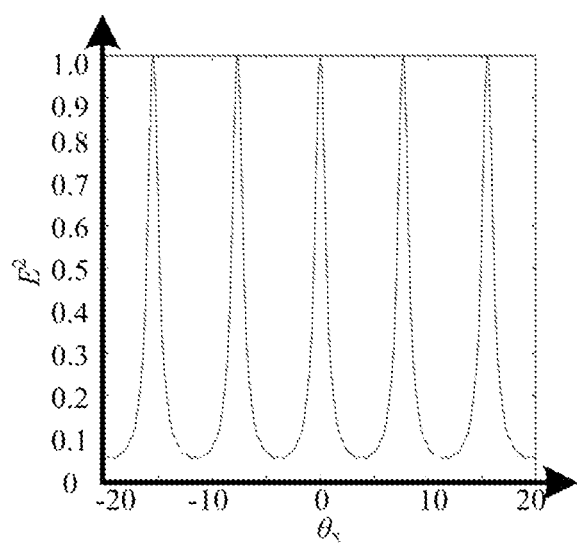 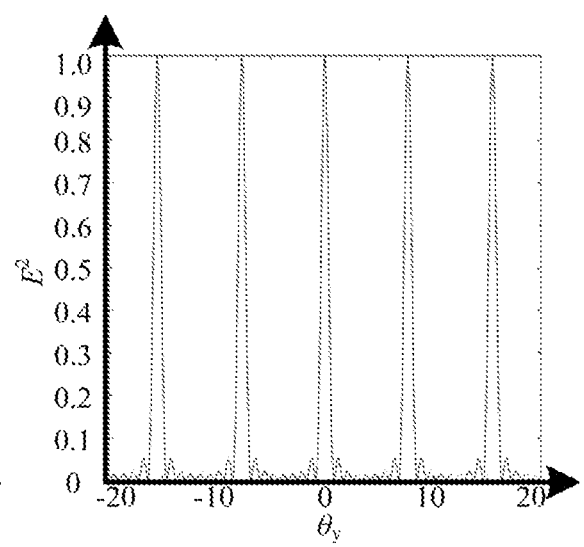
FIG. 8B  FIG. 8C

ON-CHIP OPTICAL PHASED ARRAY USING A SERIAL GRATING ANTENNA DESIGN

BACKGROUND OF THE INVENTION

Field of the Invention

The invention relates to a photonic device, and in particular, an on-chip optical phased array.

Description of Related Art

Radio wave phased arrays play important roles in modern communication, ranging and astronomy. Based on the same physics but a drastically different frequency range, chip scale silicon photonics optical phased array has lately been drawing increasing attention for a wide range of applications from free-space communication to image projection. A phased array device is generally made of many antenna units which are arranged in a two-dimensional array and are individually tunable in phase in order to form a specific output beam pattern through interference effect. The spacing between antenna units in a radio wave phased array is usually well below the operating radio wavelength to reduce higher order interference; however, in an optical phased array the spacing is generally much larger than the optical wavelength due to the limitation of optical waveguide design and fabrication. Then it is essential to make these antenna units as close to each other as possible to reduce interference hence side lobes in output beam.

On-chip optical phased array devices almost always rely on photonic waveguides to transmit and distribute light to an array of photonic antennas. The photonic waveguides can be made on chip with many optical material systems such as silicon-on-insulator, doped silica, silicon nitride, indium phosphide, lithium niobate and etc. Many on-chip phased array designs adopt two approaches. One uses a number of waveguide splitters, as shown in FIG. 1A as an example (taken from U.S. Pat. No. 5,233,673), to distribute light. In this approach, it is difficult to arrange the light output ports or photonic antennas in a two-dimensional array which is required for forming complex output beam patterns or scanning light in two-dimensions. The other uses a number of directional couplers, as shown in FIG. 1B as an example (taken from U.S. Pat. No. 8,988,754), to distribute light by a two-stage tree-branch structure. It overcomes the first approach's difficulty and can arrange photonic antennas in a two-dimensional array.

For the design described in FIG. 1B, each antenna unit is composed of three elements: an antenna where light emits, a phase shifter which can be used to adjust optical phase, and a directional coupler which splits light into two paths. In such design, the minimal spacing between adjacent antenna units is generally limited by the length of the directional couplers as the adjustment in the sizes of the grating antenna and the phase shifter are very limited for a given wavelength and a manufacturing process. For example, considering a phased array with 9 by 9 antenna units and a reasonable 81% optical power utilization made on a commonly used 220 nm (device silicon thickness) silicon-on-insulator (SOI) platform with a critical dimension of 180 nm, it requires at least a total length of 71 µm for 9 directional couplers in a row while the combined size of a grating antenna and a phase shifter (realized with a S-bend) in the row can be as short as 48.6 µm. The power utilization here is defined as the theoretical percentage of optical power that is coupled to all grating antennas while waveguide propagation loss and upward diffraction loss are not counted for fair comparison between different designs. A more demanding optical power utilization (e.g. 98%, on par with the number achievable by embodiments of the present invention) would require even longer directional couplers (e.g. 95 µm). Utilizing large number of antennas could allow smaller directional couplers for less percentage of power tapping at each one, however, it would render proportionally more complex electronic controlling circuits, more I/O ports, and most importantly more power consumption which may prevent its use in practice. Reducing optical power utilization could also reduce the length of directional couplers however again at the cost of power consumption given the same total output power.

SUMMARY

Embodiments of the present invention provide an on-chip optical phased array which includes an array of photonic antenna units that can produce complex still and scanning optical patterns through optical interference effect. Each antenna unit includes an output photonic antenna and a phase shifter that can be used for adjusting the optical phase of each optical beam output to form certain optical interference arrangement. The optical phased array including the array of photonic antenna units and the electrodes that connect and provide electrical power to them can be made on a single chip of silicon using complementary metal-oxide-semiconductor (CMOS) or compatible fabrication processes. In particular, embodiments of the invention provide an on-chip optical phased array that includes an array of a pair of a photonic grating antenna and a phase shifter that is connected in series by photonic waveguides and arranged in a two-dimensional array. By eliminating the use of directional couplers or waveguide splitters employed in conventional designs, the design according to embodiments of this invention significantly reduces overall phased array size especially when the number of the antenna is small which is often demanded in practice.

The on-chip optical phased array according to embodiments of the present invention uses shallow-etched gratings that are connected in series by photonic waveguides while arranged in two-dimensional array. These shallow-etched gratings serve both as antennas and as optical power taps. As a result, the spacing between antennas can be small and is independent of the number of antenna units as well as optical power utilization. The reduction in antenna spacing not only reduces device footprint as well as cost but also helps minimize side lobes in output beam.

In one aspect, the present invention provides a on-chip optical phased array for forming far field optical patterns from an input coherent light source, which includes: a substrate; a plurality of antenna units formed on the substrate, each antenna unit including: a grating antenna, formed in an optical wave guiding layer, configured to emit a pre-defined portion of an input light out of a plane of the optical wave guiding layer and to transmit remaining input light which passes through the grating antenna; a waveguide phase shifter, formed in the optical wave guiding layer, configured to adjust an optical phase and a field strength of the antenna unit by an applied electrical power; and an optical waveguide which connects the grating antenna and the waveguide phase shifter via direct butt coupling; and a plurality of additional optical waveguides including a plurality of optical waveguide bends, which serially connect the antenna units in a serpentine shape, wherein the plurality of grating antennas are arranged in a two-dimensional array with equal or unequal distances between them; and wherein the emitted light from the plurality of grating antennas forms a far field optical pattern based on optical interference.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIG. 8A is a simulated far field optical power pattern of the optical phased array shown in FIG. 3 with equal phase condition at each shallow etched grating antenna.

FIG. 8B is a simulated far field optical power distribution along angles in x direction extracted from FIG. 8A.

FIG. 8C is a simulated far field optical power distribution along angles in y direction extracted from FIG. 8A.

DETAILED DESCRIPTION OF PREFERRED EMBODIMENTS

Figure 2:
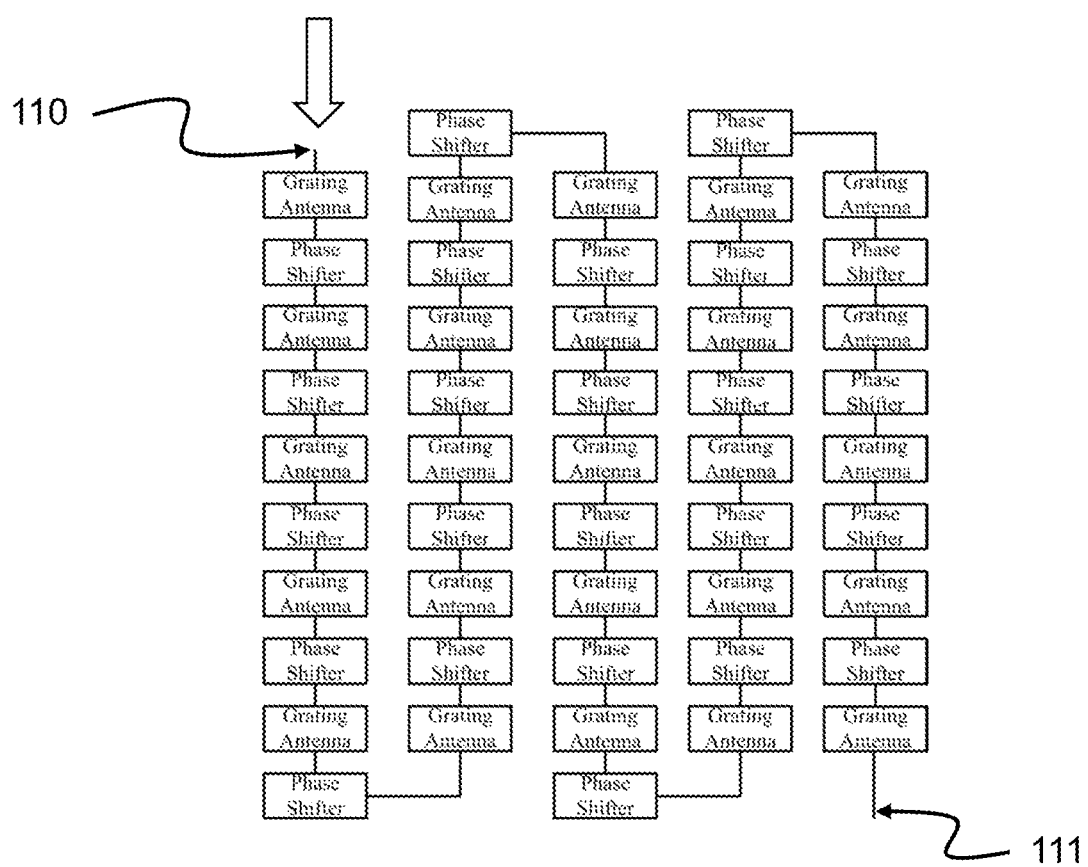
FIG. 2 is a block diagram illustrating the design principle of the optical phased array using an in-series grating antenna design according to an embodiment of the present invention.
Figure 3:
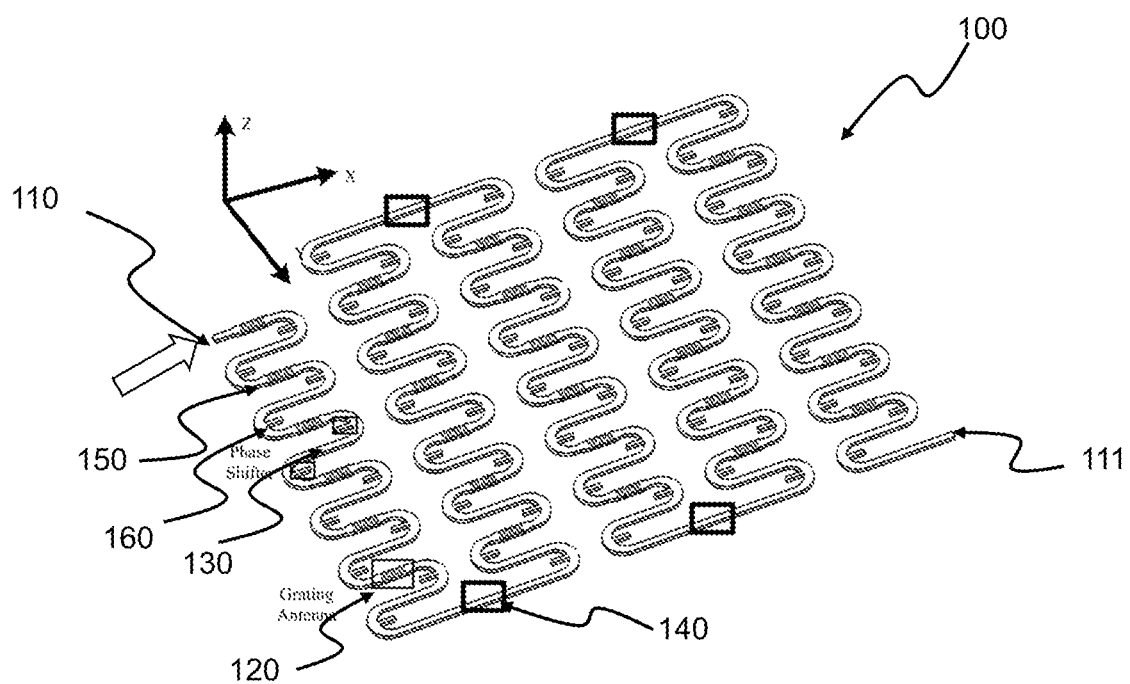
FIG. 3 is a perspective view of the on-chip optical phased array using an array of in-series grating antennas and phase shifters arranged in a closed packed multi-section serpentine shape according to the embodiment of the present invention.

An embodiment of the present invention is described with reference to FIG. 2 and FIG. 3. The on-chip optical phased array 100 includes an array of grating antenna 120 and phase shifter 130 pairs that are connected by waveguides 150 in series and are arranged in a closed packed multi-section serpentine shape effectively making all antennas in a rectangular grid with equal or unequal spacing between adjacent grid points. All the components can be made on a single optical chip on any optical wave guiding material platform such as silicon-on-insulator (SOI), silicon nitride, doped silicon oxide, indium phosphite, etc. In particular for SOI platform, the chip can be made by complementary metal-oxide-semiconductor (CMOS) fabrication processes. The spacing between adjacent antennas in x or y directions are generally between 5 μm to 20 μm and can be equally or unequally distributed. An unequally spaced antenna grid design is usually adopted for better side lobe suppression of far field optical patterns. The bending radius of waveguide bends 160 within the rows of the array and the length of the waveguide sections 140 connecting adjacent rows can be appropriately chosen to meet the equal or unequal grid spacing requirement. The waveguides 150 can include taper structures to connect the grating antenna 120 and the phase shifter 130 when they have different waveguide widths. The waveguide input 110 can be made at the edge of the chip to couple a light source from an optical fiber or can be connected to other waveguide structures that can be used for other types of light source coupling or for other optical functions. The waveguide output 111 can be made with structures to attenuate the remaining optical power or can be connected to other waveguide structures.

The waveguide phase shifter 130 is a waveguide section configured to adjust the optical phase of the light passing through it by an applied electrical power, so as to adjust the optical phase and field strength of the antenna unit. In one implementation, the waveguide phase shifter is an optical waveguide section made of a semiconductor material that can be made to present a pre-defined resistivity by being doped with other materials. A pair of electrodes is formed and connected to the waveguide section to provide electrical power to heat up the waveguide section via resistance heating or allow it to cool down by cutting off the power, in order to change the optical refractive index hence the optical phase of the waveguide section. In another implementation, the waveguide phase shifter is an optical waveguide made of an electro-optic material or a semiconductor material, and its refractive index can be adjusted by electric field or carrier concentration, so that a pair of electrodes can be formed and connected to the waveguide to provide electrical field or inject carriers in order to change the optical refractive index hence the optical phase of the waveguide. In yet another implementation, the waveguide phase shifter is an optical waveguide with a resistance heating element disposed closed to the waveguide, so that a pair of electrodes can be formed and connected to the heating element to provide electrical power to heat up or cool down the nearby waveguide via heat conduction in order to change the optical refractive index hence the optical phase of the waveguide.

Figure 1A:
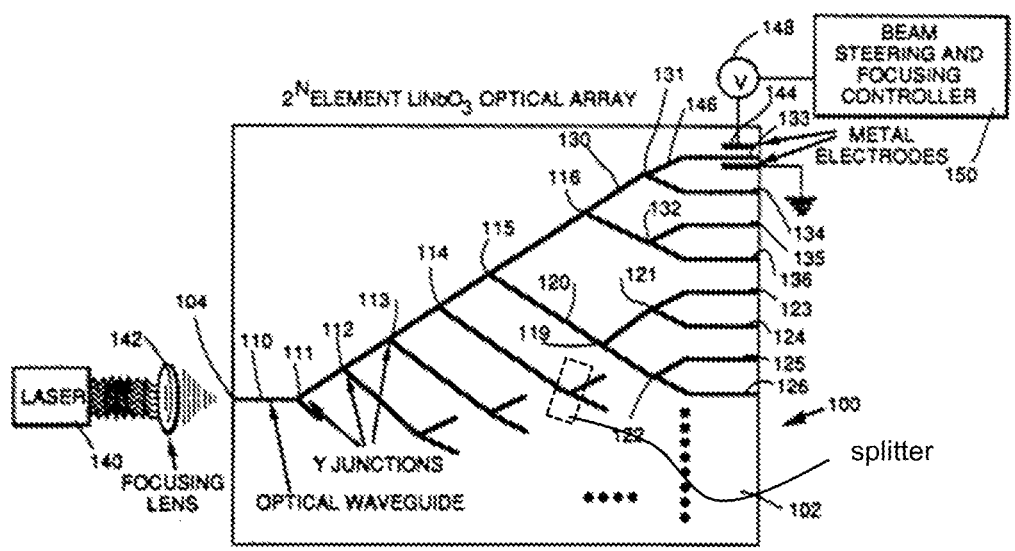
FIG. 1A is a schematic design of a conventional on-chip phased array.
Figure 1B:
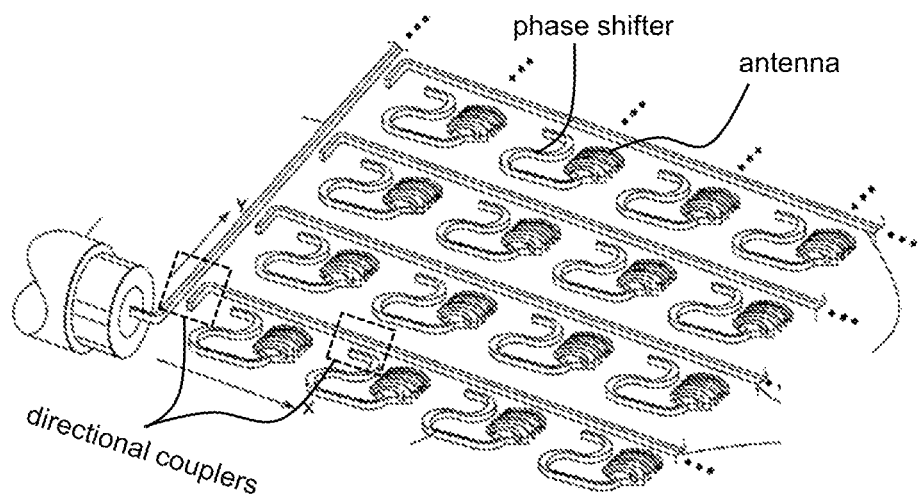
FIG. 1B a schematic design of another conventional on-chip phased array.
Figure 4A:
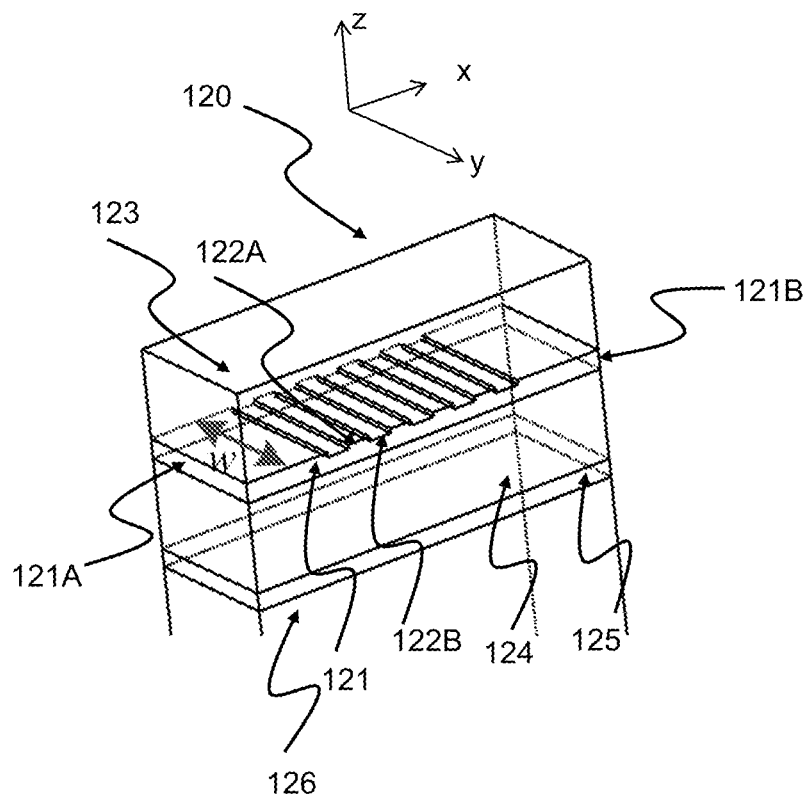
FIG. 4A is a perspective view of the 3D section of a shallow-etched grating antenna out of the optical phased array shown in FIG. 3.
Figure 4B:
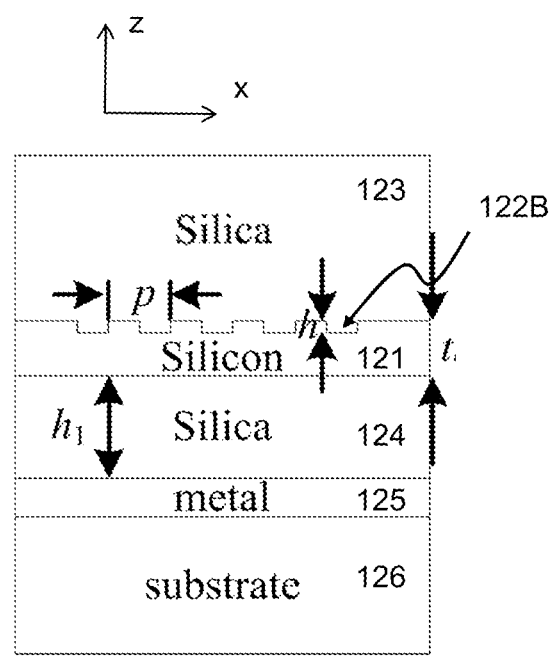
FIG. 4B is a cross-sectional view of the shallow-etched grating antenna shown in FIG. 4A.

A key component of the embodiment of the present invention is the shallow-etched grating antenna 120, a detailed perspective view of the 3D section of which is shown in FIG. 4A and FIG. 4B. The grating antenna 120 is generally formed in an optical wave guiding layer on the chip, and includes a core layer 121 with periodic etched trenches 122B (period p), an upper cladding layer 123 above the core layer, a lower cladding layer 124 (with a thickness of $h_1$) below the core layer on top of a substrate 126. The refractive index of the core layer 121 is higher than that of the upper and the lower cladding layers. The optical wave guiding layer, which includes the core layer 121 and the upper and lower cladding layers 123 and 124, is a layer formed on the top side of the chip, and can be made to form waveguides, gratings, phase shifters, optical mode converters, and other photonic structures, by introducing dimension and shape changes. The multiple grating antennas 120 and waveguide phase shifters 130 are formed in the optical wave guiding layer. An optional highly reflective layer 125 made of metal or multi-layer of dielectric materials can be formed between the lower cladding layer 124 and the substrate 126 to enhance the out-of-plane diffraction (in or close to the z direction) performance of the grating antenna. Unlike the pie-shape curved grating antenna used in the conventional structure shown in FIG. 1B, which is optimized for maximal upward diffracted light power and therefore only has an input port connected with a waveguide, the shallow-etched grating antenna 120 has a uniform width w and straight grating unetched teeth 122A and etched trenches 122B, which are parallel to each other and perpendicular to the light propagation direction of the waveguide, with a small etch depth h compared with total core thickness t. Such a grating structure allows a majority of the light to pass through (in x direction) to the next grating antenna while diffracts the rest of the light upwards (in or close to z direction) as light output. The input port 121A and the output port 121B of the grating antenna 120 is connected to an input optical waveguide and an output waveguide respectively. The ratio of h/t is in the range of, but not limited to, 5% to 15% which allows the use of a reasonable number of antennas in series. Note here that while the teeth 122A and trenches 122B are formed at the boundary between the core layer 121 and the upper cladding layer, they may also be formed at the boundary between the core layer and the lower cladding layer, or both boundaries.

Figure 5:
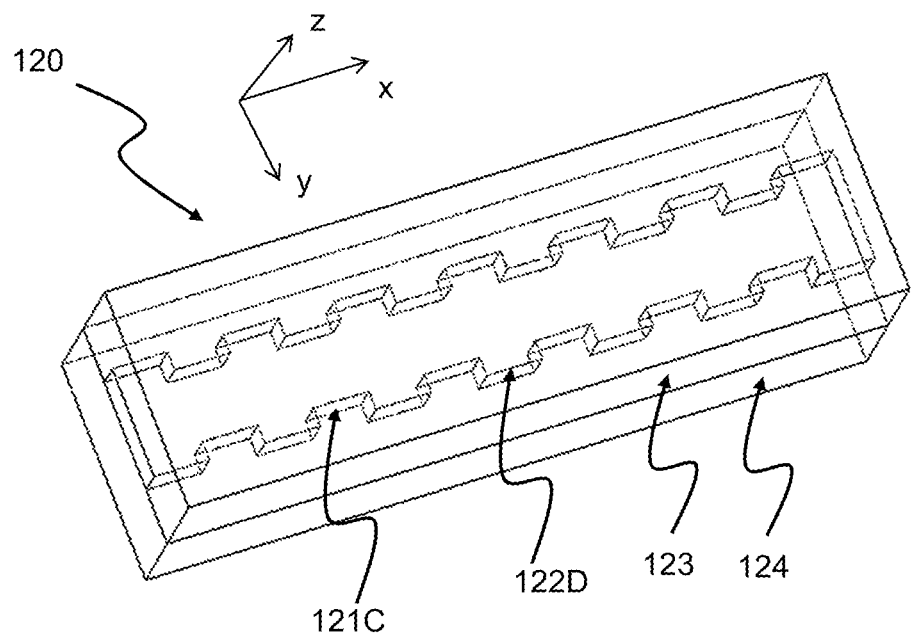
FIG. 5 is a perspective view of the 3D section of an edge-modulated grating antenna according to an alternative embodiment of the present invention.

An alternative design to the shallow-etched structure described above is a deep-etched edge-modulated grating structure. FIG. 5 is a perspective view of the 3D section of such an edge-modulated grating antenna. In such a case, the etch depth (i.e., the z-direction height of the sections 122C and 122D) can be as deep as the thickness of the entire waveguide core layer, typically from 70% to 100% of that thickness, whereas the change in waveguide core width (in the y direction) between recessed sections 122C and protruding sections 122D can be sufficiently small, such as 5% to 15%, so that the out-of-plane diffractive light is comparable to the case of the shallow-etched design.

The following paragraphs describe an example which is intended to highlight the aspects of the invention without the limiting its scope.

Figure 6:
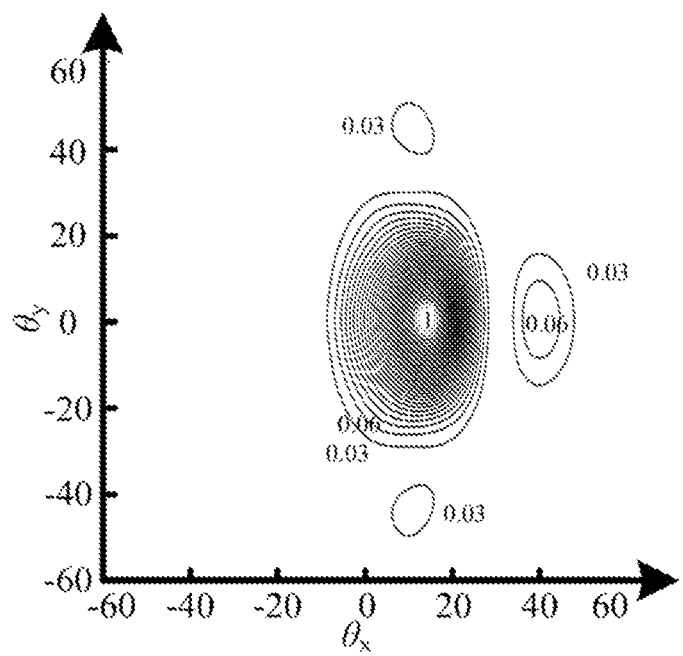
FIG. 6 is a simulated far field optical power pattern of a single shallow-etched grating antenna according to the embodiment of the present invention.

FIG. 6 is a far field optical power pattern of a single shallow-etched grating antenna shown in FIGS. 4A and 4B with design parameters as follows: w=1 μm, p=0.62 μm, t=220 nm, h=20 nm and $h_1$=1 μm. The x and y axes of FIG. 6 are far field angles in x and y directions respectively where the optical power is calculated. It shows a good Gaussian-like far field. The largest side lobe peak appears about 20 degrees in x direction is less than 6% (or −12 dB) of the main peak power which indicates sufficiently good single peak output pattern for many applications.

Figure 7:
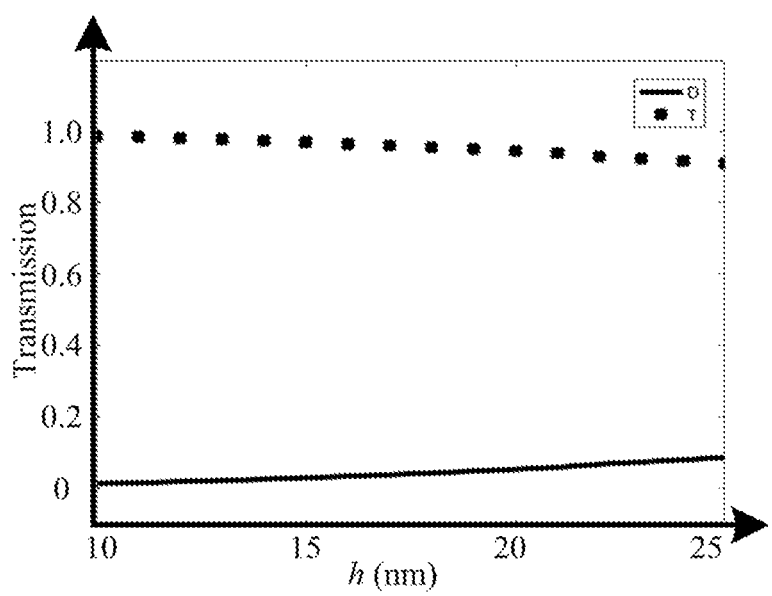
FIG. 7 is a simulated pass-through transmitted and upward diffracted optical power as a function of grating teeth height of a shallow-etched grating antenna according to the embodiment of the present invention.

FIG. 7 is a simulated pass-through transmitted (T) and upward diffracted optical power (D) as a function of grating teeth height h of a shallow-etched grating antenna 120 with the rest of the design parameters the same as used in the FIG. 5 calculation. This data may be used to choose an appropriate teeth height h for a required number of antennas and total optical power utilization (power efficiency) for target applications.

Using such shallow etched grating antennas 120 in series can lead to unequal optical power upward diffracted out of each antenna as the power before entering each antenna is related to the number of antennas thus total power loss (to diffracted light output) before it. However, this inequality of optical power does not significantly affect optical interference thus output pattern performance. FIG. 8A is a simulated far field optical power pattern of the optical phased array 100 shown in FIG. 3 with 9×9 grating antennas 120 and equal phase condition at each one. FIG. 8B and FIG. 8C are simulated far field optical power distribution along angles in x direction and y direction respectively extracted from FIG. 8A. It shows an array of clear Gaussian-like optical power peaks due to optical interference among all grating antennas 120 which is nearly the same as an equal optical power case.

It will be apparent to those skilled in the art that various modification and variations can be made in the on-chip optical phased array device of the present invention without departing from the spirit or scope of the invention. Thus, it is intended that the present invention cover modifications and variations that come within the scope of the appended claims and their equivalents.

What is claimed is:

1. An on-chip optical phased array for forming far field optical patterns from an input coherent light source, comprising:
   a substrate;
   a plurality of antenna units formed on the substrate, each antenna unit including:
      a grating antenna, formed in an optical wave guiding layer, configured to emit a pre-defined portion of an input light out of a plane of the optical wave guiding layer and to transmit remaining input light which passes through the grating antenna;
      a waveguide phase shifter, formed in the optical wave guiding layer, configured to adjust an optical phase and a field strength of the antenna unit by an applied electrical power; and
      an optical waveguide, formed in the optical wave guiding layer, which connects the grating antenna and the waveguide phase shifter via direct butt coupling; and
   a plurality of additional optical waveguides including a plurality of optical waveguide bends, formed in the optical wave guiding layer, which serially connect the plurality of antenna units in a serpentine shape, wherein the remaining input light which passes through one grating antenna is transmitted to another antenna unit by one of the additional optical waveguides, wherein the plurality of grating antennas are arranged in a two-dimensional array with equal or unequal distances between them; and
   wherein the emitted light from the plurality of grating antennas forms a far field optical pattern based on optical interference.

2. The on-chip optical phased array of claim 1, wherein the optical wave guiding layer comprises:
   a core layer, a bottom cladding layer below the core layer, and an upper cladding layer above the core layer forming a stack in parallel on the substrate,
   wherein an optical refractive index of the core layer is higher than that of the top cladding layer and the bottom cladding layer.

3. The on-chip optical phased array of claim 2, wherein the grating antenna comprises:
   a plurality of trenches formed in the core layer of the wave guiding layer, the trenches being parallel to the plane of the optical wave guiding layer, parallel to each other and perpendicular to a light propagation direction, wherein a ratio of a depth of the trenches to a thickness of the core layer is between 5% to 15%.

4. The on-chip optical phased array of claim 2, wherein the grating antenna comprises an edge-modulated grating, formed by a plurality of alternating recessed sections and protruding sections in the core layer which recess and protrude in a width direction of the core layer, wherein a ratio of a width difference between the recessed sections and the protruding sections is between 5% to 15%.

5. The on-chip optical phased array of claim 1, wherein the phase shifter comprises:

an optical waveguide made of a semiconductor material having a pre-defined resistivity by doping with other materials, and a pair of electrodes connected to the waveguide to provide electrical power to heat up the waveguide via resistance heating to change the optical refractive index of the optical waveguide, or an optical waveguide made of an electro-optic material or a semiconductor material having a refractive index that is adjustable by electric field or carrier concentration, and a pair of electrodes connected to the waveguide to provide electrical field or inject carriers to change the optical refractive index of the optical waveguide, or an optical waveguide and a resistance heating element which is disposed closed to the optical waveguide, and a pair of electrodes connected to the heating element to provide electrical power to heat up or cool down the optical waveguide via heat conduction to change the optical refractive index of the optical waveguide.

6. The on-chip optical phased array of claim 1, wherein the optical waveguide connecting the grating antenna and the phase shifter of each antenna unit includes an optical mode converter section which has a tapering width that matches different widths of the grating antennas and the phase shifters.

7. The on-chip optical phased array of claim 1, wherein the lengths of the optical waveguides connecting the grating antennas and the respective phase shifters are selected to provide distances between the grating antennas that optimizes performance of the far-field optical patterns.

8. The optical wave guiding layer of claim 2, wherein the optical wave guiding layer further comprises a highly reflective layer made of metal or multi-layer of dielectric materials formed between the lower cladding layer and the substrate.

* * * * *